March 24, 1959   R. R. METRULIS   2,878,569
COMBINATION LEVEL, RULE AND PROTRACTOR DEVICE
Filed Feb. 6, 1956   2 Sheets-Sheet 1
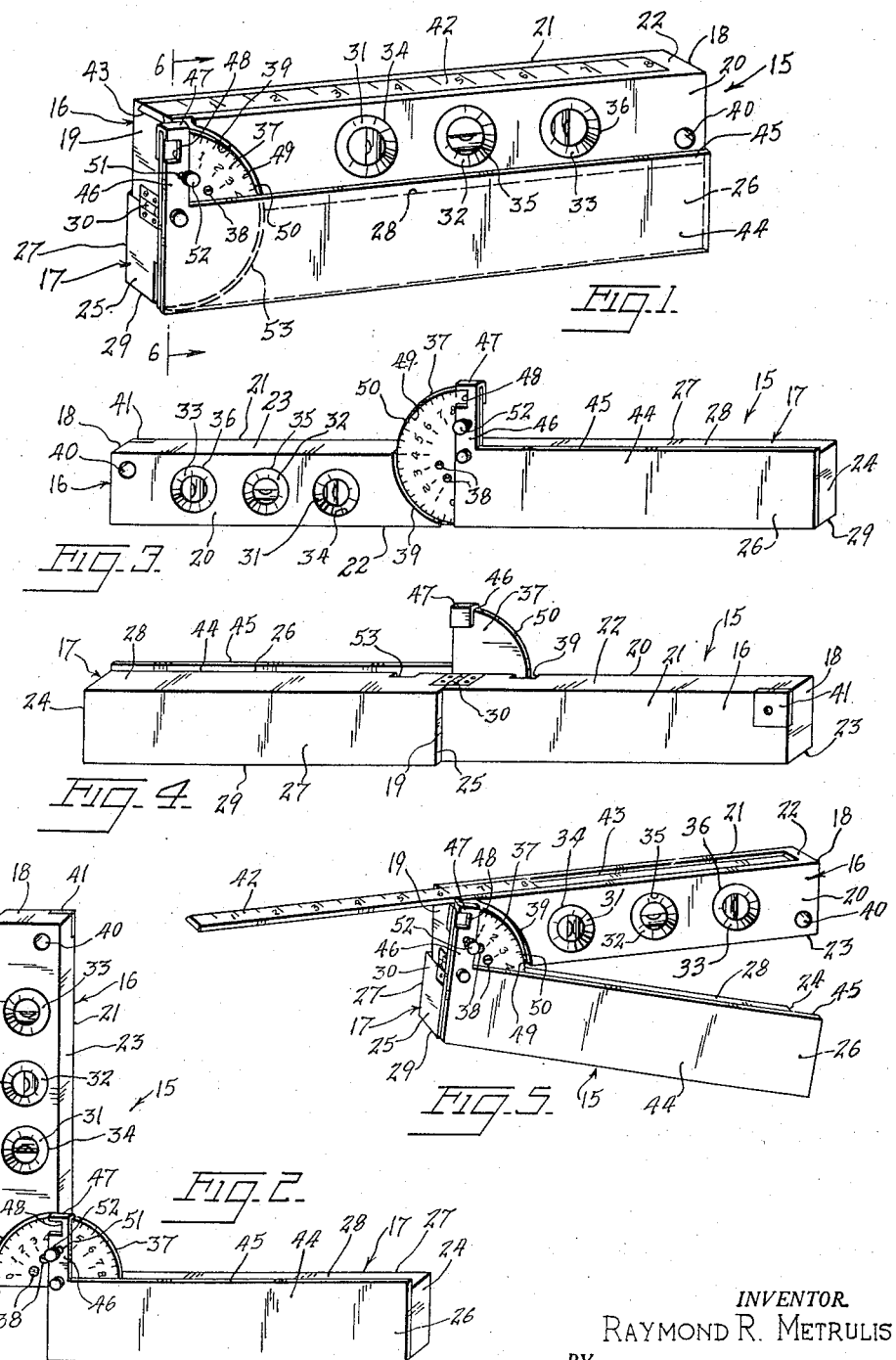
INVENTOR.
RAYMOND R. METRULIS
BY
ATTORNEY March 24, 1959  R. R. METRULIS  2,878,569
COMBINATION LEVEL, RULE AND PROTRACTOR DEVICE
Filed Feb. 6, 1956  2 Sheets-Sheet 2
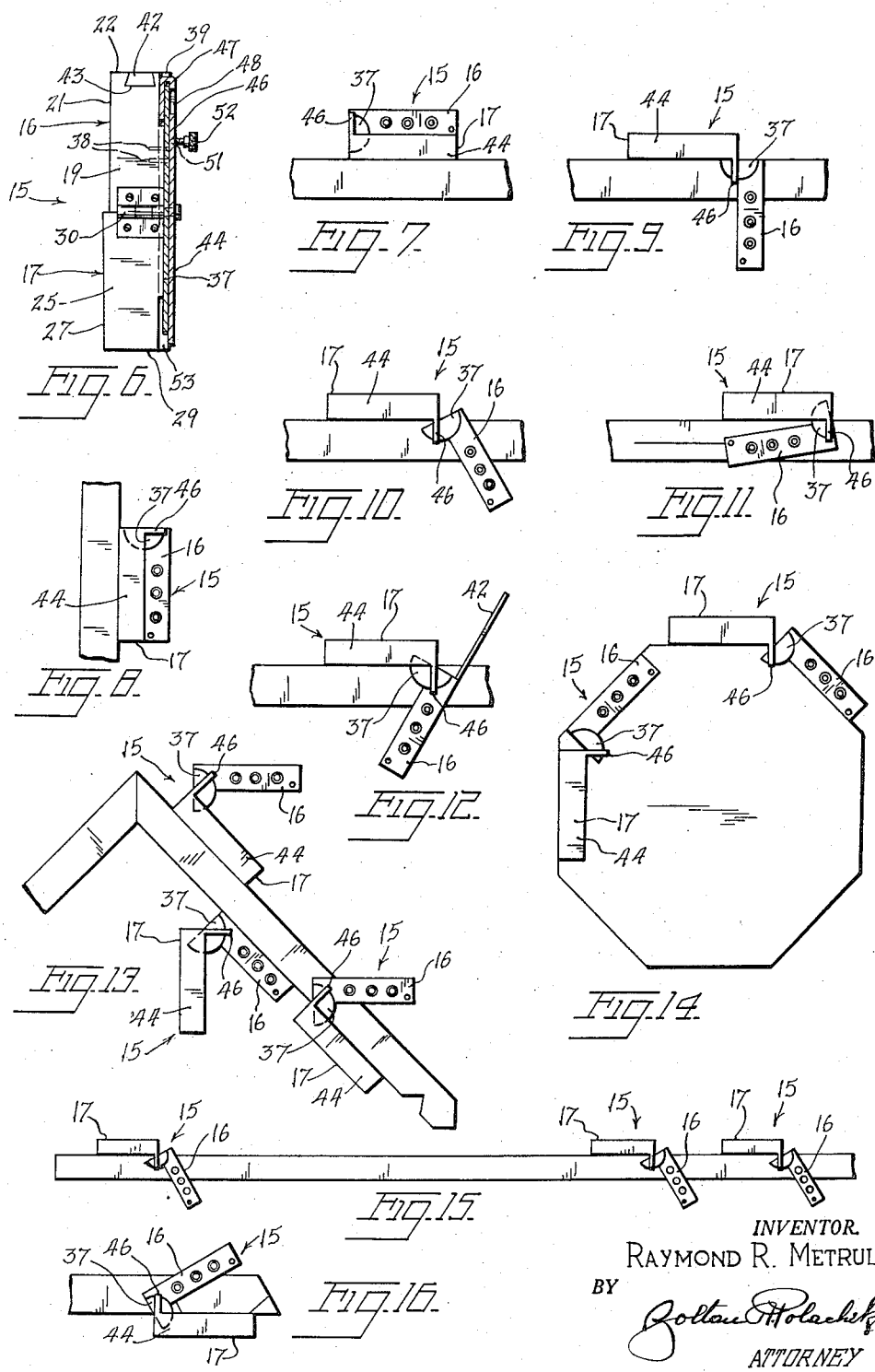
INVENTOR.
RAYMOND R. METRULIS
BY
ATTORNEY

United States Patent Office 2,878,569
Patented Mar. 24, 1959

2,878,569

COMBINATION LEVEL, RULE AND PROTRACTOR DEVICE

Raymond R. Metrulis, Massapequa Park, N.Y.

Application February 6, 1956, Serial No. 563,652

1 Claim. (Cl. 33—88)

This invention relates to new and useful improvements in measuring, leveling and computing devices.

More particularly, the present invention proposes the construction of an improved combined level, rule and protractor which will enable a builder, carpenter, joiner, hobbyist, handyman or home owner easily and conveniently to perform many of the complex measuring, computing and planning functions necessary in building and repairing.

As a further object, the present invention proposes forming a compact, sturdy and accurate device which will incorporate in one cooperating instrument the features of a level, plumb, square, mitre, bevel, protractor, marking gauge, inclinometer, angle divider, adjustable angle jig and rafter layout.

Another object of the present invention proposes constructing the device so that it can be made at relatively low cost to replace a variety of related tools having a much greater aggregate cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a combined level, rule and protractor device constructed and arranged in accordance with the present invention.

Fig. 2 is a view similar to Fig. 1 but showing the arms at right angles.

Fig. 3 is a front perspective view of the device with the arms open and in 180° alignment.

Fig. 4 is a rear view similar to Fig. 3.

Fig. 5 is a view similar to Fig. 1 but showing the arms partly separated and the rule partly extended.

Fig. 6 is a sectional view taken on line 6—6 of Fig. 1.

Fig. 7 is a diagrammatic view showing the device used as a level.

Fig. 8 is a view similar to Fig. 7 but showing the device used as a plumb.

Fig. 9 is a view similar to Fig. 7 but showing the device used as a square.

Fig. 10 is a view similar to Fig. 7 but showing the device used as a mitre.

Fig. 11 is a view similar to Fig. 7 but showing the device used as a marking gauge.

Fig. 12 is a view similar to Fig. 7 but showing the device used as a protractor.

Fig. 13 is a view similar to Fig. 7 but showing the device used as an inclinometer.

Fig. 14 is a view similar to Fig. 7 but showing the device used as a measure for inside and outside angles and as an angle divider and a bevel angle transfer device.

Fig. 15 is a view similar to Fig. 7 but showing the device used for making plumb cup in framing square bracing.

Fig. 16 is another view and similar to Fig. 7 but showing the device used for making seat cut for framing square bracing.

Referring more particularly to the drawings, the combined level, rule and protractor device of the present invention is designated generally by the reference numeral 15.

Device 15 has two arms 16 and 17 which may be made of wood, plastic, metal or other rigid or semi-rigid material. The upper arm 16 has ends 18 and 19, front and back sides 20 and 21 and top and bottom flat edges 22 and 23. Likewise lower arm 17 has ends 24 and 25, front and back sides 26 and 27 and top and bottom flat edges 28 and 29. The lower arm 17 is thicker than the upper arm 16 but otherwise the two arms are substantially the same size.

A hinge 30 of the piano type is secured to ends 19 and 25 of the arms 16 and 17 at the side edge 26 of the lower arm 17 and at the side edge 20 of the upper arm 16. The hinge 30 pivotally connects the two arms 16 and 17 together for longitudinal alignment as shown in Figs. 3 and 4 or in superposed position as shown in Figs. 1 and 6, or for any intermediate position as shown in Figs. 2 and 5. In the superposed position of Figs. 1 and 6, the bottom edge 23 of the upper arm 16 rests flushly and flatly on the top edge 28 of the lower arm 17.

A plurality of spaced liquid levels 31, 32 and 33 are mounted on the upper arm 16 recessed in openings 34, 35 and 36 which extend through the arm. Levels 31 and 33 are vertical levels and level 32 is a horizontal level.

Also mounted on the upper arm 16 is a protractor 37, the protractor being secured as by screws 38 to the front side 20 of the arm 16 adjacent the end 19 in a protractor recess 39 provided in the front side. A marking opening 40 is provided in the upper arm 16 adjacent the other end 18, a shield and bearing plate 41 of plastic, ivory or any other material being provided for the opening 40 on the back side 21 of arm 16 firmly to hold the point of the marker used.

Slidably mounted in the top edge 22 of the upper arm 16 is a sliding rule 42 calibrated in inches or other markings to form a working gauge, and seated in a dovetail groove 43 in the top edge 22 of the arm 16. The face of the rule 42 is made of plastic or like strip shaped or formed slidably to fit in the dovetail groove 43.

Mounted on and fixed to the front side 26 of the lower arm 17 is a front cover plate 44 which has an upper edge 45 that extends above and beyond the top edge 28 of the lower arm 17.

Front cover plate 44 has a protractor reading guide and locking portion 46 which extends further beyond the upper or top edge 28 of lower arm 17 than upper edge 45 and which is disposed adjacent the end 25 of arm 17. This portion 46 extends over the protractor 37 and has an end guide 47 bent over the protractor 37 so that the protractor may move thereunder as the arms are pivoted on hinge 30. The protractor 37 is disposed adjacent hinge 30 and overlaps the lower arm 17 when the arms 16 and 17 are in the superposed position of Fig. 1.

The protractor reading guide and locking portion 46 has a reading opening 48 disposed in alignment with the markings 49 on the peripheral marginal edge portion 50 of the protractor 37.

A locking screw opening 51 is provided in the protractor reading guide and locking portion 46 and a locking screw 52 fits this opening 51 to lock the arms 16 and 17 in any pivoted position. The protractor reading guide and locking portion 46 of the front cover plate 44 is disposed perpendicular to the top edge 28 of the lower arm 17.

Lower arm 17 is also provided with a protractor recess 53 for the protractor freely to move through between the arm 17 and front cover plate 44 as the arms 16 and 17 are pivoted on hinge 30. The upper marginal edge portion 45 of the front cover plate 44 lies closely adjacent the front side 20 of the upper arm 16 when the arms 16 and 17 are in the superposed position of Fig. 1.

The device 15 may be used in a variety of ways. It may be used as a rule as illustrated in Fig. 5 as a level, as illustrated in Fig. 7; as a plumb, as illustrated in Fig. 8; as a square, as shown in Fig. 9; as a mitre as shown in Fig. 10; as a marking gauge, as shown in Fig. 11; as a protractor, as illustrated in Fig. 12, as an inclinometer, as illustrated in Fig. 13; as an angle divider and bevel angle transfer device, as illustrated in Fig. 14; as a device for framing square bracing, as illustrated in Fig. 15, or as illustrated in Fig. 16.

The ready reference tables on the face of the device quickly and easily give a workman the necessary information for the job he is doing with the device. All the structural parts of the device cooperate to give any type use required of the device.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A combined level, rule and protractor comprising a pair of arms each having two ends, front and back sides and top and bottom edges, a hinge secured to one end of each arm pivotally connecting the arms together for axial longitudinal alignment or in a superposed position with the bottom edge of one arm resting on the top edge of the other arm, a plurality of spaced liquid levels and a protractor mounted on one of said arms and a front cover plate mounted on the other arm, said protractor being disposed adjacent said hinge and overlapping the other arm when the arms are in superposed position, said front cover plate having a protractor reading guide and locking portion extending beyond the upper edge of the arm on which the front cover plate is mounted and over the protractor, said protractor reading guide and locking portion having a hooked-over end portion for guiding the edge of the protractor and having a reading opening disposed in alignment with the arcuate markings on the peripheral marginal edge portion of the protractor, said guide and locking portion having a locking screw opening and a locking screw extending through the screw opening in said guide and locking portion of the front cover plate to lock the arms in any pivoted position, said protractor reading guide and locking portion of the front cover plate being disposed perpendicular to the top edge of the arm on which the front cover plate is mounted, said front cover plate having an upper marginal edge portion extending beyond the top edge of the arm on which said front cover plate is mounted and adapted to lie closely adjacent the front side of the other arm when the arms are in superposed position.

References Cited in the file of this patent

UNITED STATES PATENTS

| | | |
|---|---|---|
| | Dearborn | Apr. 29, 1808 |
| 160,503 | Ascough | Mar. 9, 1875 |
| 861,011 | Ahlberg | July 23, 1907 |
| 875,462 | Rowan | Dec. 31, 1907 |
| 1,625,735 | Maurer | Apr. 19, 1927 |
| 2,251,208 | Sigmon | July 29, 1941 |